US008984120B2

(12) United States Patent
Saxena et al.

(10) Patent No.: US 8,984,120 B2
(45) Date of Patent: Mar. 17, 2015

(54) DETERMINING AN UNEXPECTED DISCONNECT EVENT CONSTRAINT WITHIN A TEXT EXCHANGE SESSION

(75) Inventors: Pukhraj Saxena, Leinster (IE); Radhika Sohoni, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 12/970,398

(22) Filed: Dec. 16, 2010

(65) Prior Publication Data

US 2012/0158859 A1  Jun. 21, 2012

(51) Int. Cl.
G06F 15/173 (2006.01)
G06F 3/048 (2013.01)
H04L 12/58 (2006.01)
H04L 12/18 (2006.01)

(52) U.S. Cl.
CPC ............. *H04L 51/043* (2013.01); *H04L 51/30* (2013.01); *H04L 12/1827* (2013.01)
USPC .......................................... 709/224; 715/758

(58) Field of Classification Search
USPC .................................. 715/758; 709/206, 224
See application file for complete search history.

(56) References Cited

U.S. PATENT DOCUMENTS

| | | | | |
|---|---|---|---|---|
| 6,134,582 A * | 10/2000 | Kennedy | ......................... | 709/206 |
| 6,330,589 B1 * | 12/2001 | Kennedy | ......................... | 709/206 |
| 7,370,317 B2 * | 5/2008 | Cabrera et al. | ................ | 717/105 |
| 7,503,007 B2 * | 3/2009 | Goodman et al. | ............ | 715/758 |
| 7,895,277 B2 * | 2/2011 | Drory et al. | ................... | 709/206 |
| 2003/0187990 A1 * | 10/2003 | Knauerhase et al. | ......... | 709/227 |
| 2005/0091219 A1 * | 4/2005 | Karachale et al. | ............... | 707/10 |
| 2006/0248183 A1 * | 11/2006 | Barton | .......................... | 709/224 |
| 2007/0083600 A1 * | 4/2007 | Bakos et al. | ................... | 709/206 |
| 2007/0162553 A1 * | 7/2007 | Dewing et al. | ................ | 709/207 |
| 2007/0162594 A1 * | 7/2007 | Henry et al. | ................... | 709/224 |
| 2007/0271340 A1 * | 11/2007 | Goodman et al. | ............ | 709/206 |
| 2008/0082620 A1 | 4/2008 | Barsness | | |
| 2008/0162632 A1 | 7/2008 | O'Sullivan et al. | | |
| 2008/0311961 A1 | 12/2008 | Cotevino et al. | | |
| 2009/0006979 A1 * | 1/2009 | Callanan et al. | ............... | 715/751 |

(Continued)

FOREIGN PATENT DOCUMENTS

WO   WO 2005/017746 A2 *  2/2005

OTHER PUBLICATIONS

IBM Lotus Sametime 8 Information Center, Last updated on Apr. 28, 2008.*

(Continued)

*Primary Examiner* — David Lazaro
*Assistant Examiner* — Mahran Abu Roumi
(74) *Attorney, Agent, or Firm* — Patents on Demand P.A.; Brian K. Buchheit; Scott M. Garrett

(57) ABSTRACT

A device communicatively linked with a text exchange session can be identified. The device can be a computing device associated with a computing resource. The resource can be associated with a state and state information. The device can be associated with a text exchange application. State information associated with the computing resource can be obtained. The state information can be a resource identifier and a resource value. A computing resource state change can be determined. The determination can be responsive to a disconnect event associated with the device. The disconnect event can result in the device not communicatively linked to the text exchange session.

25 Claims, 3 Drawing Sheets

(56) References Cited

U.S. PATENT DOCUMENTS

2009/0210476 A1* 8/2009 Levy et al. .................... 709/201
2010/0138780 A1* 6/2010 Marano et al. ................ 715/804
2010/0161993 A1* 6/2010 Mayer .......................... 713/178
2011/0252319 A1* 10/2011 Garcia et al. .................. 715/702

OTHER PUBLICATIONS

Lotus Same Time Mobile.*
Top reasons to try IBM Sametime software.*
Qualitative and Quantitave Value (IBM.com).*

* cited by examiner

DETERMINING AN UNEXPECTED DISCONNECT EVENT CONSTRAINT WITHIN A TEXT EXCHANGE SESSION

BACKGROUND

The present invention relates to the field of text exchanges. Text exchange (e.g., instant message) provides significant utility within many organizations. Text exchanges (e.g., IM chats) can often supplement or replace face-to-face meetings in a situation where participants are unable to meet. In many instances, a participant within a text exchange session can be unexpectedly disconnected from the session.

BRIEF SUMMARY

One aspect of the present invention can include a method, a computer program product, a system, and an apparatus for determining an unexpected disconnect event constraint within a text exchange session. A device communicatively linked with a text exchange session can be identified. The device can be a computing device associated with a computing resource. The resource can be associated with a state and a state information. The device can be associated with a text exchange application. State information associated with the computing resource can be obtained. The state information can be a resource identifier and a resource value. A computing resource state change can be determined. The determination can be responsive to a disconnect event associated with the device. The disconnect can result in the device not communicatively linked to the text exchange session.

Another aspect of the present invention can include a system, a computer program product, a method, and an apparatus for determining an unexpected disconnect event constraint within a text exchange session. A connection manager can determine a state change associated with a computing device responsive to a disconnect event. The computing device can be associated with a text exchange session. The computing device can be associated with a state. The state can be associated with a state information. The disconnect event can be a non-user initiated termination of a communication stream associated with the computing device. The connection manager can be associated with a text exchange server. An event mapping can be configured to link a constraint identifier with a notification identifier associated with a notification. The constraint can be a computing resource associated with the computing device.

DETAILED DESCRIPTION

Figure 1:
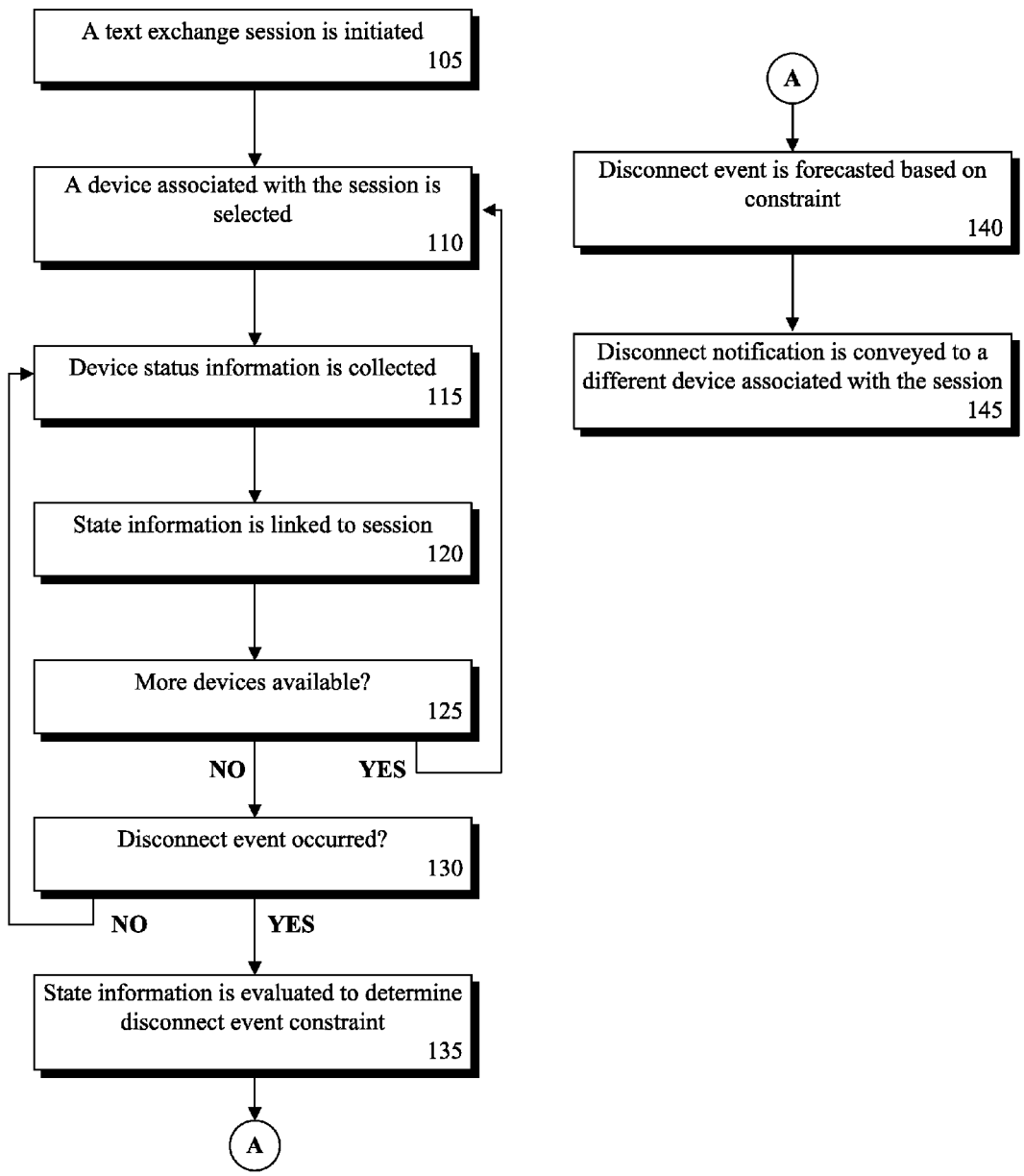
FIG. 1 is a flowchart illustrating a method for determining an unexpected disconnect event constraint within a text exchange session in accordance with an embodiment of the inventive arrangements disclosed herein.

Whenever the participant is unexpectedly absent, various problems can arise. Often times, other participants can be unaware of the duration for which the absent participant can be missing. In worse case scenarios, the participant can be absent for the entire text exchange session due to extenuating circumstances.

In many instances, the participant can be unable to contact other participants to indicate the problem. Problems can range from various failures such as, computing device battery drain, network disconnects, and text exchange application crashes. For example, a participant's laptop battery can completely discharge during an instant message chat, unexpectedly disconnecting the participant from the chat.

The present disclosure is a solution for determining an unexpected disconnect event constraint within a text exchange session. In the solution, a disconnect event associated with a computing device of a text exchange session can occur. The disconnect event can include, but is not limited to, a constraint and a duration. The constraint can include, but is not limited to, device resource limitations (e.g., hardware failures), associated computing resource limitations (e.g., connected devices), software errors, and the like. The constraint can be identified and an appropriate notification can be conveyed to a different computing device associated with the text exchange. In one embodiment, the notification can be presented to a text exchange session member indicating the constraint and/or the duration of the disconnect event. For instance, a notification can be presented to indicate a participant's laptop network connectivity is limited if the participant is unexpectedly absent during a text exchange session.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart illustrating a method 100 for determining an unexpected disconnect event constraint within a text exchange session in accordance with an embodiment of the inventive arrangements disclosed herein. In method 100, a text exchange session between two or more computing device can be initiated. For example, the text exchange session can be an instant message chat. Computing resources associated with each computing device linked with the text exchange session can be monitored. State information can be collected periodically during the text exchange session. A disconnect event associated with a computing device can occur during the session. The disconnect event can be triggered from a non-user initiated event resulting from a state change of a computing resource. For example, a laptop associated with a participant of an instant message chat can unexpectedly disconnect from the session due to a low battery charge.

A constraint of a disconnect event can include, but is not limited to, hardware, software, and the like. In one embodiment, a constraint can include a hardware/software failure resulting in a disconnect event to occur. In the embodiment, a constraint can result in terminating a connection stream between a text exchange server and a text exchange application associated with a computing device.

A notification indicating a state change associated with a monitored computing resource can be conveyed to each device within the session in response to the disconnect event occurrence. For instance, a notification can be presented if a text exchange application unexpectedly exits.

In step 105, a text exchange session can be initiated between multiple computing devices. For example, the computing devices can be a laptop and a tablet computer associated with users in different geographic locations. As used herein, a text exchange can be a real-time communication between two or more computing devices associated with two or more users. For instance, a text exchange can be an Instant Message (IM) chat. Text exchange can include, but is not limited to, video conferencing, co-browsing, internet relay chat, multi-user chat (e.g., chat room), and the like.

In step 110, a device associated with the session can be selected. Selection can be programmatically determined which can include, random device selection, address selection, geographic location selection, resource selection. In one instance, devices with limited resources can be selected prior to devices with ample computing resources. For example, devices with limited networking resources can be prioritized during selection.

In step 115, the state information can be collected from the selected device. State information can be collected from computing resources associated with the selected device. Resources can include hardware and/or software resources, presence information, and the like. In one instance, resources can be computing resources directly associated with the computing resource. In the instance, hardware/software within the device can be monitored. In another instance, resources indirectly associated with the device can be monitored. In the instance, hardware/software entities remotely linked to the selected device can be analyzed. For example, a wireless router can be polled to determine network connectivity. In one embodiment, state information can be performance metrics, historic metrics, presence metrics, and the like.

In step 120, the state information can be linked to the text exchange session. The state information can be a portion of the text exchange session data. In step 125, if more devices associated with the text exchange session, the method can return to step 110, else continue to step 130. In step 130, if a disconnect event is detected, the method can continue to step 135, else return to step 115. The disconnect event can be detected in utilizing traditional and/or conventional mechanisms. In step 135, state information can be evaluated to determine a disconnect event constraint. The constraint can be a computing resource state. For example, the constraint can be a text exchange application state such as a memory allocation exception. In step 140, the disconnect event can be forecasted based on type of constraint. The forecast can include, but is not limited to, a qualitative duration, a quantitative duration, and the like. For example, the forecast can indicate a time duration (e.g., twenty minutes) before a participant can rejoin the text exchange session. In one embodiment, historic state information can be utilized to determine a forecast.

In step 145, a disconnect notification can be conveyed to an interface associated with different device within the session. The interface can be associated with a text exchange application. For example, a notification can be presented within an interface associated with an IBM LOTUS SAMETIME application.

Drawings presented herein are for illustrative purposes only and should not be construed to limit the invention in any regard. Method 100 can be performed for each computing device associated with the text exchange session. In one embodiment, method 100 can be a functionality of a text exchange server permitting existing text exchange application capabilities to be extended. It should be understood that steps 110-145 can be continuously performed during a text exchange session.

Figure 2:
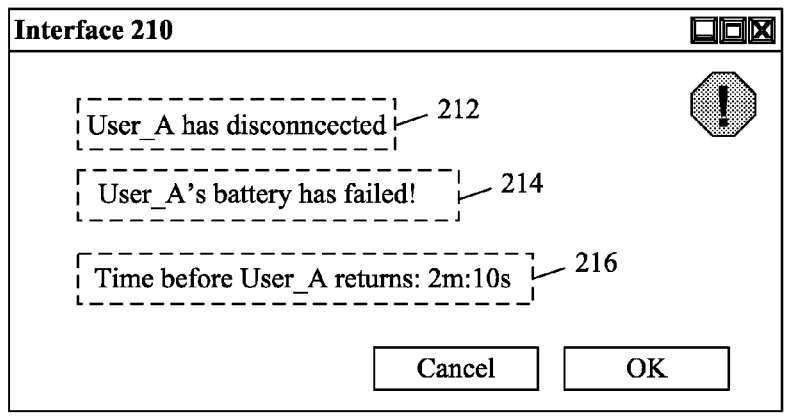
FIG. 2 is a schematic diagram illustrating a set of interfaces for determining an unexpected disconnect event constraint within a text exchange session in accordance with an embodiment of the inventive arrangements disclosed herein.
Figure 2:
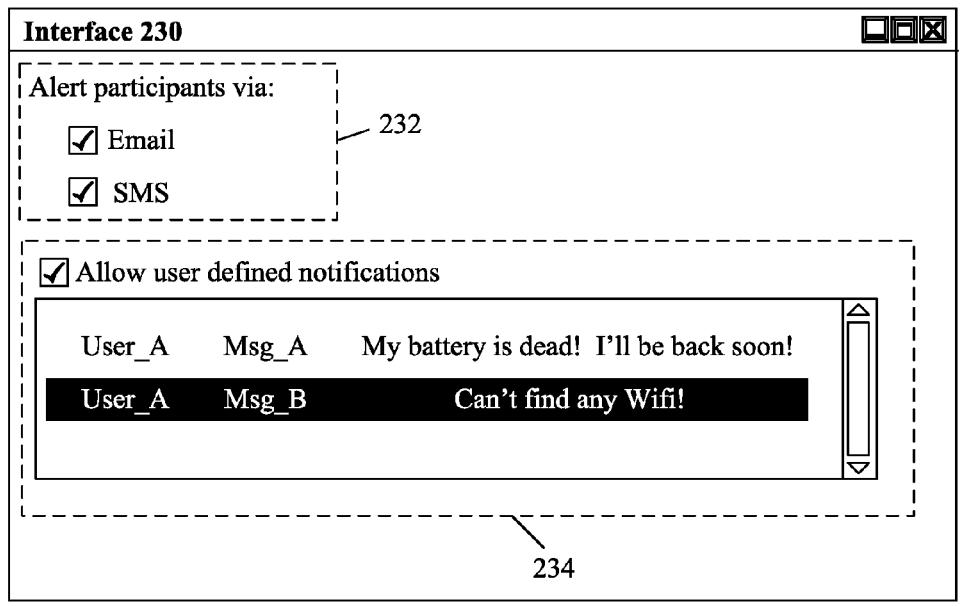

FIG. 2 is a schematic diagram illustrating a set of interfaces 210, 230 for determining an unexpected disconnect event constraint within a text exchange session in accordance with an embodiment of the inventive arrangements disclosed herein. Interface 210, 230 can be present in the context of method 100 and system 300. Interface 210 can be associated with a text exchange application (e.g., text exchange application 324). Interface 210 can be presented responsive to a disconnect event. For example, interface 210 can be presented to all participants within a chat session if a moderator of the chat session unexpectedly disconnects. Interface 230 can be associated with a text exchange application and/or a text exchange server. Interface 230 can be presented if a configuration option action is enacted. For example, interface 230 can be presented within a tab of a configuration dialog associated with an IBM LOTUS SAMETIME server. Interface 210, 230 can be a component of a graphical user interface (GUI), a voice user interface (VUI), text-based interface, a mixed mode interface, and the like.

In interface 210, notification 212-216 can be presented responsive to a disconnect event. Notification 212-216 can be selectively presented based on user and/or server configurations. Notifications 212-216 can include, but is not limited to, graphics, text, video, multimedia content, and the like. In one instance, notification 212-216 can be text messages indicating a disconnect event occurred and providing relevant information to connected participants of a text exchange session. In the instance, notification 212-216 can indicate the cause of the disconnect event and a duration for the disconnect event. For example, interface 210 can indicate User_A has disconnected from a chat session due to a battery failure and can re-connect to the chat session within two minutes.

In one configuration of the instance, mapping information can be utilized to account for user movement within a real-world space. In the configuration, zones within the mapping information can be established to indicate available resources including, but not limited to, power source locations, network connectivity, and the like. That is, as a user moves from one zone to another, a time duration can be estimated.

In one configuration of the instance, the interface 210 can be a pop-up dialog presented within a viewable area of a screen. In another configuration of the instance, notification 212-216 can be presented inline (e.g., system messages) within a text exchange window (e.g., chat window).

In one embodiment, notification 216 can include a countdown timer, indicating remaining time before a device can be expected to re-connect to a session.

In interface 230, notification configurations can be presented enabling flexible alerting behaviors to be established. In interface 230, option 232, 234 can be selectively configured. Option 232 can permit additional notification mechanisms to be engaged, allowing multiple forms of notification to exist. Option 232 can include, but is not limited to, electronic mail, Short Message Service (SMS), Multimedia Message Service (MMS), and the like. In one instance, option 232 can permit notification if multiple devices disconnect from a text exchange session. For example, a participant can receive a notification of disconnect from another participant experiencing a disconnect. Option 234 can enable user defined notifications to be configured. In one instance, option 234 can present user-defined notifications for each participant of a text exchange session. In another instance, option 234 can present all user-defined notifications registered within a text exchange server.

Drawings presented herein are for illustrative purposes only and should not be construed to limit the invention in any regard. Interface 210, 230 can present graphical artifacts including, but not limited to, a text box, a checkbox, a radio dialog, pop-up dialog, selection box, and the like. Interface 210, 230 functionality can be accessible through a drop down menu (e.g., file menu), context menu, and the like.

Figure 3:
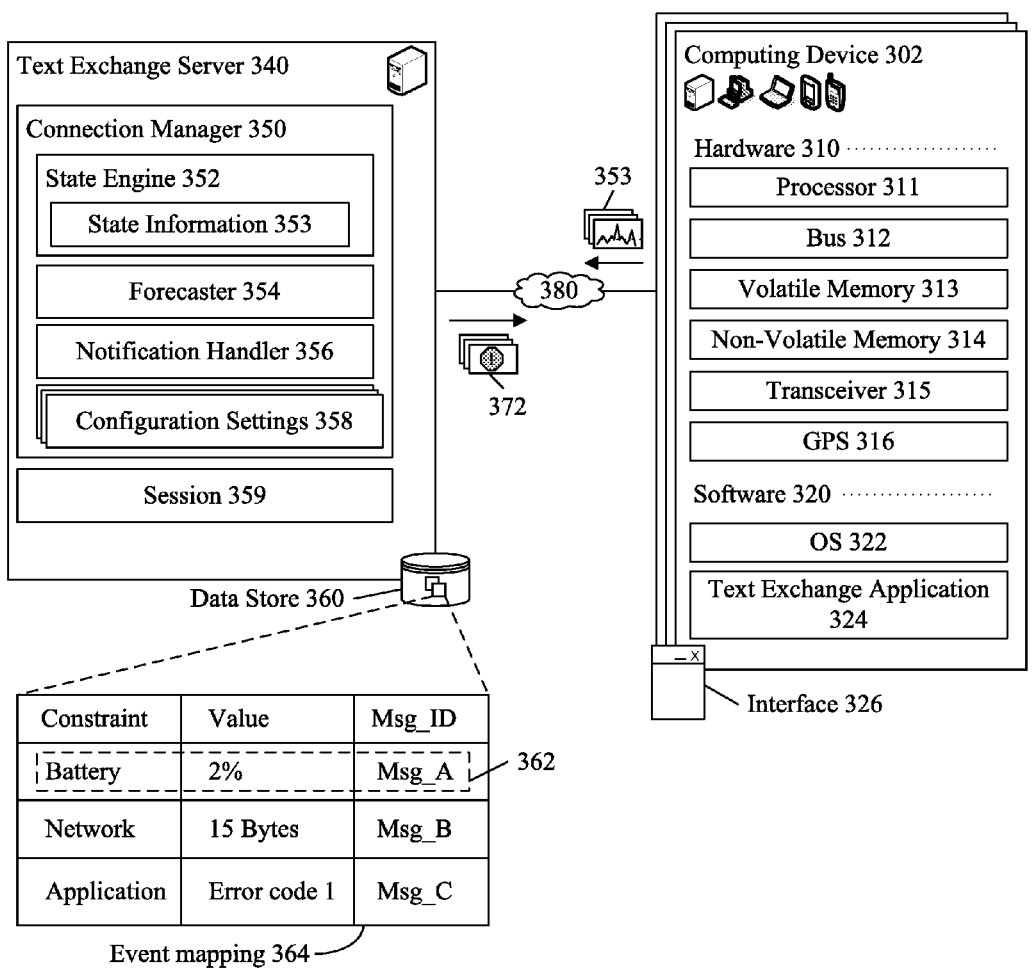
FIG. 3 is a schematic diagram illustrating a system for determining an unexpected disconnect event constraint within a text exchange session in accordance with an embodiment of the inventive arrangements disclosed herein.

FIG. 3 is a schematic diagram illustrating a system 300 for determining an unexpected disconnect event constraint within a text exchange session in accordance with an embodiment of the inventive arrangements disclosed herein. System 30 can be present in the context of method 100 and interface 210, 230. In system 300, a computing device 302 can be communicatively linked to text exchange server 340 via network 380. In system 300, it should be understood that computing device 302 can include, multiple computing devices communicatively linked to a text exchange session 359 via server 340.

In system 300, state information 353 obtained from computing device 302 can be utilized to determine constraints resulting in a disconnect event during a text exchange session 359. State information 353 can be analyzed to determine a constraint triggering the disconnect event. Based on the analysis, a notification 372 can be presented to different computing devices connected to the session 359 indicating the cause of the disconnect event. For instance, participants of an instant message chat session can be presented with relevant information (e.g., cause, duration) about an absent participant.

Text exchange server 340 can be a hardware/software component able to communicatively link computing device 302 via text exchange session 359. Server 340 can include, but is not limited to, manager 350, session 359, data store 360, and the like. In one instance, server 340 can be a component of a Service Oriented Architecture (SOA). In one embodiment, server 340 can be an IBM LOTUS SAMETIME GATEWAY. That is, server 340 can be a middleware platform providing unexpected disconnect event constraint determination.

Connection manager 350 can be a hardware/software computing element able to track device 302 session information. Manager 350 can include, but is not limited to, state engine 352, forecaster 354, notification handler 356, configuration settings 358, and the like. Manager 350 can conform to traditional and/or proprietary connection and/or session management conventions. Manager 350 functionality can include, but is not limited to, connection initiation, connection management, session tracking, and the like. As used herein, a connection can refer to a stateful and/or stateless communication stream established between server 340 and device 302. A connection can be associated with one or more communication protocols including, but not limited to, Transmission Control Protocol (TCP), User Datagram Protocol (UDP), and the like. For instance, a connection can be a TCP connection established between an Instant Message (IM) engine 350 and an IM application 324 via network 380. In one instance, manager 350 can be a network element communicatively linked to system 300 components State engine 352 can be a hardware/software element able to monitor device 302 component state. Engine 352 can include, but is not limited to, state information 353, device 302 profile information (e.g., hardware list), and the like. Engine 352 can receive state information 353 periodically during session 359. In one embodiment, engine 352 can be configured to poll device 302 for state information 353. In another embodiment, device 302 can periodically convey information 353 to engine 352. For instance, text exchange application 324 can generate an error code which can be conveyed to engine 352 for analysis. Engine 352 can analyze information 353 to determine changes in device 302 hardware 310 and/or software 320. Engine 352 can utilize one or more rulesets (e.g., settings 358) to identify a disconnect event trigger. For example, an error code generated by application 324 can be analyzed to determine application 324 encountered an unrecoverable error and terminated.

State information 353 can be a unique configuration associated with computing device 302. State information 352 can include data associated with, but not limited to, compatible states, equivalent states, distinguishable states, and the like. State information can include, but is not limited to, a software state, a hardware state, a hardware/software metric, and the like. Hardware state/metric can include, but is not limited to, timing information (e.g., date/time stamp), processor state values, memory addresses, transceiver activity, Global Positioning System (GPS) location data, and the like. Software state/metric can include, but is not limited to, an operational code, resource usage, and the like.

Forecaster 354 can be hardware/software component able to determine the duration of a disconnect event based on a constraint. The constraint can be associated with one or more values utilized in determining disconnect event duration. Values can include, but is not limited to, a type, a severity value, and the like. In one instance, constraint type can include, but is not limited to, power, communication, peripheral, application, and the like. For instance, a laptop battery can be a constraint type of power source. Severity value can be a numeric value, including, but not limited to, real number, decimal, percentage, and the like. Values can be computed to determine a duration for the disconnect event. In one embodiment, historic values can be utilized to improve the duration forecast of the disconnect event. In the embodiment, historic values for each device associated with a session can be collected to determine an average duration for a constraint type.

Notification handler 356 can be a hardware/software component able to convey a notification in response to a disconnect event occurring within a session 359 associated with a device 302. Handler 356 can utilize event mapping 364 to determine an appropriate message to convey. For instance, if the last recorded state of a battery of a device is two percent prior to a disconnect event, a Msg_A notification can be conveyed indicating a battery failure. In one instance, notification handler 356 can be utilized to generate a notification 372 presenting a disconnect event history for a disconnected device. In the instance, notification 372 can include time, date, and duration of historic disconnect events, enabling a participant to manually estimate a disconnect event duration.

Event mapping 364 can be one or more datasets for linking a constraint associated with a computing device 302. Mapping 364 can include, but is not limited to, a constraint identifier, a constraint name, a state value, a notification identifier, and the like. In one embodiment, mapping 364 can be stored within a hash table, array, associative array, and the like. In one instance, mapping 364 can be a portion of a database table. In one embodiment, mapping 364 can be dynamically updated during session 359 enabling real-time disconnect event constraint determination. Mapping 364 can be automatically and/or manually established.

Configuration settings 358 can be one or more rulesets for establishing server 340 and/or manager 350 behavior. Settings 358 can include, but is not limited to, notification settings, state information settings (e.g. polling settings), security settings, session options, and the like. Settings 358 can be automatically and/or manually established. In one instance, settings 358 can be heuristically determined based on historic configurations.

Computing device 302 can be a hardware/software element able to execute a text exchange application 324. Computing device 302 can be, but is not limited to, desktop computer, laptop, mobile phone, Portable Digital Assistant (PDA), tablet computing device, portable multimedia device, embedded device, and the like. Computing device 302 can include, but is not limited to, hardware 310, software 320, interface 326, and the like. In one instance, computing device 302 can be associated with additional peripherals including, but not limited to, a microphone, a camera, a loudspeaker, and the like.

Hardware 310 can be one or more physical components able to execute software 320. Hardware 310 can include, but is not limited to, processor 311, bus 312, volatile memory 313, non-volatile memory 314, transceiver 315, GPS 316, and the like. Hardware 310 can be subject to behavior which can trigger a disconnect event by interrupting normal operation of text exchange application 324. Behavior can include but is not limited to, operational failures, exceeded tolerances, and the like.

Software 320 can be one or more digitally encoded executable code able to establish a text exchange session between server 340 and device 302. Server 320 can include, but is not limited to, Operating System 322, text exchange application 324, and the like. Software 320 can be subject to behavior which can trigger a disconnect event by interrupting normal operation of text exchange application 324. Behavior can include, but is not limited to, exceptions, unrecoverable error, fault, flaw, and the like.

Text exchange application 342 can be a software entity able to convey text exchange messages from a computing device 302 to server 340. Text exchange application 324 can be, but is not limited to, a desktop application, a mobile phone application, portable computing device application, and the like. Text exchange application 324 can be associated with one or more communication protocols including, but not limited to, Extensible Markup Language and Presence Protocol (XMPP), Voice over Internet Protocol, Session Initiated Protocol (SIP), SIP for Instant Messaging and Presence Leveraging Extensions (SIMPLE), Application Exchange (APEX), Presence and Instant Messaging Protocol (PRIM), Open Mobile Alliance (OMA), Instant Messaging and Presence Service (IMPS), Hypertext Transport Protocol (HTTP), and the like. Text exchange application 324 can be associated with one or more interfaces including, but not limited to, text exchange window (e.g., interface 326), desktop interface, a contact list (e.g., buddy list), and the like.

Interface 326 can be a user interface for presenting notification 372 in response to a disconnect event. Interface 326 can be associated with text exchange application 324 and/or connection manager 350. Interface 326 can be, but is not limited to, a graphical user interface (GUI), text-based interface, voice user interface (VUI), mixed-mode interface, and the like. Interface 326 can permit user interaction with notification 372 if a notification 372 is presented. In one instance, interface 326 can be a Web-based interface. For example, interface 326 can be a Web browser window executing a multiprotocol instant message chat application.

Data store 360 can be a hardware/software component for persisting event mapping 364. Data store 360 can be a component of a Storage Area Network (SAN), Network Attached Storage (NAS), and the like. Data store 360 can be, but is not limited to, an Relation Database Management System (RDBMS), Object Oriented Database Management System (OODBMS), and the like.

Network 380 can be one or more computing devices communicatively linked to enabling resource sharing between computing device 302 and/or server 340. Network 380 can include, but is not limited to, Wide Area Network (WAN), Local Area Network (LAN), Metropolitan Area Network (MAN), and the like. Network 380 can include, but is not limited to, public networks, private networks, virtual private networks, and the like. In one instance, network 380 can be the Internet. Network 380 can include, but is not limited to, wired technologies, wireless technologies, and any combination thereof.

Drawings presented herein are for illustrative purposes only and should not be construed to limit the invention in any regard. It should be appreciated that state information 353 can be stored within session 359 data. In one instance, state information 353 can be persisted within data store 360. It should be understood that system 300 functionality can be present within a distributed computing system, networked computing environment, cloud computing environment, and the like. System 300 functionality can be encapsulated within an application programming interface (API), Web-based service, and the like. In one embodiment, system 300 can be a component of an Instant Messaging Manager system It should be appreciated that system 300 can be associated with security mechanism including, but not limited to, encryption, authentication, and the like. In one embodiment, system 300 can be associated with a presence server, enabling presence information to be utilized in determining disconnect event constraints.

It should be appreciated that system 300 functionality is presented within a client/server context for exemplary purposes and should not be construed to limit the invention in any regard. Implementations such as peer-to-peer can be supported by the disclosure.

In one instance, system 300 functionality can be implemented within a social network infrastructure enabling social network applications to gain capabilities described within the disclosure.

It should be appreciated that system 340 functionality can be implemented within existing systems without requiring functional modifications to the existing systems. For instance, a legacy Unified Communications (UC) infrastructure can be easily enhanced by communicatively linking system 340 with the UC infrastructure.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   identifying a device communicatively linked with a text exchange session, wherein the device is a computing device associated with a computing resource, wherein the computing resource is associated with a state and a state information, wherein the computing device is associated with a text exchange application;
   obtaining state information associated with the computing resource, wherein the state information is at least one of a resource identifier and a resource value;
   analyzing the state information to identify a constraint that triggers a disconnect event,
   responsive to the disconnect event associated with the device, determining a computing resource state change, wherein the disconnect results in the device not communicatively linked to the text exchange session;
   communicating to a different device linked with the text exchange session, a notification detailing the disconnect event and causes for the disconnect event.

2. The method of claim 1, wherein the computing resource is at least one of a hardware computing resource and a software computing resource.

3. The method of claim 1, further comprising: conveying a notification to a different device associated with the text exchange session, wherein the notification comprises information specifying the constraint.

4. The method of claim 3, wherein the notification comprises of at least one of a computing resource identifier and a disconnect event duration.

5. The method of claim 3, wherein the notification is a user defined notification.

6. The method of claim 3, wherein the notification is conveyed via at least one of an electronic mail and a Short Message Service.

7. The method of claim 1, further comprising: determining a duration associated with the disconnect event, wherein the duration is at least one of a qualitative value and a quantitative value.

8. The method of claim 1, wherein the application is a middleware application for providing real-time text communications.

9. A system comprising:
   one or more processors;
   a non-transitory storage medium storing program instructions able to be executed by the one or more processors;
   a constraint determining unit, comprising at least a portion of the program instructions, to determine, based on state information of a computing device, a constraint that causes a disconnect event in the computing device, wherein the computing device participates in a text exchange session, wherein the computing device is associated with a state, wherein the state is associated with a state information, wherein the disconnect event is a non-user initiated termination of a communication stream provided to the computing device;

a connection manager, comprising at least a portion of the program instructions, able to determine a state change associated with the computing device responsive to the disconnect event, wherein the connection manager and the constraint determining unit are associated with a text exchange server;

an event mapping, comprising at least a portion of the program instructions, configured to link a constraint identifier with a notification identifier associated with a notification, wherein the constraint is a computing resource associated with the computing device; and a notification manager, comprising at least a portion of the program instructions, to communicating to a different device linked with the text exchange session, a notification detailing the disconnect event and causes for the disconnect event.

10. The system of claim 9, wherein the text exchange server is a middleware application for providing real-time text communications.

11. The system of claim 9, further comprising:

a state engine, comprising at least a portion of the program instructions, able to evaluate a state change associated with the computing resource, wherein the evaluation is a programmatic analysis of the state information associated with the computing device;

a forecaster, comprising at least a portion of the program instructions, configured to determine a duration associated with the disconnect event; and a notification handler, comprising at least a portion of the program instructions, able to convey the notification to an interface associated with a different computing device linked to the text exchange session.

12. The system of claim 9, wherein the computing resource is at least one of a hardware resource and a software resource, wherein the hardware resource is at least one of a power source, a network transceiver, and a peripheral, wherein the software resource is at least one of an operating system and a text exchange application.

13. The system of claim 9, wherein the connection engine is able to detect the configuration of a text exchange application associated with the computing device.

14. The system of claim 9, wherein the notification is at least one of a text exchange message, an electronic mail, and a Short Message Service message.

15. The system of claim 9, wherein the duration is a quantitative value, wherein the quantitative value is a timing value.

16. The system of claim 9, wherein the notification is at least one of a pre-defined notification and a user established notification.

17. A computer program product comprising a non-transitory computer readable storage medium having computer usable program code embodied therewith, the computer usable program code comprising:

computer usable program code stored in a non-transitory storage medium, if said computer usable program code is executed by a processor it is operable to identify a device communicatively linked with a text exchange session, wherein the device is a computing device associated with a computing resource, wherein the computing resource is associated with a state and a state information, wherein the computing device is associated with a text exchange application;

computer usable program code stored in a non-transitory storage medium, if said computer usable program code is executed by a processor it is operable to obtain state information associated with the computing resource, wherein the state information is at least one of a resource identifier and a resource value;

computer usable program code stored in a non-transitory storage medium, if said computer usable program code is executed by a processor it is operable determine a computing resource state change, wherein the disconnect results in the device not communicatively linked to the text exchange session, wherein the determination is responsive to a disconnect event associated with the device, wherein the computer program product is operable to convey a notification to a different device associated with the text exchange session, wherein the notification comprises a computing resource identifier and a disconnect event duration and computer usable program code stored in a non-transitory storage medium, if said computer usable program code is executed by a processor it is operable to communicate to a different device linked with the text exchange session, a notification detailing the disconnect event and causes for the disconnect event.

18. The computer program product of claim 17, wherein the computer program product is a component of middleware software.

19. The computer program product of claim 17, the computer usable program code comprising:

computer usable program code stored in a non-transitory storage medium, if said computer usable program code is executed by a processor it is operable to analyze the state information to identify a constraint that triggers a disconnect event.

20. The computer program product of claim 19, wherein the notification is conveyed via at least one of an electronic mail and a Short Message Service.

21. A system comprising:

at least one server comprising hardware that manages a text exchange communication session between at least two remotely located communication devices, wherein the text exchange communication session is a real-time session during which two or more humans exchange textual messages with each other via the at least one remotely located communication devices; and a means for detecting a change of state in at least one of the at least two remotely located communication devices, which indicates that the communication device has been unexpectedly disconnected from a network that connects that communication device to the at least one server;

a means for predicting or determining a constraint that caused the disconnection; and a means for predicting or determining an expected time before the disconnected communication device is reconnected to the network, wherein said message of the notification handler indicates the predicted or determined expected time; and a notification handler for conveying a message to at least one of the at least two remotely located communication devices, wherein said conveyed message indicates that one communication device has been unexpectedly disconnected and indicates the predicted or determined constraint of the disconnection.

22. The system of claim 21, wherein the means for predicting or determining further comprises:

a means for predicting or determining a constraint that caused the disconnection, wherein the message indicates the predicted or determined constraint.

23. The system of claim 22, wherein content of the message comprises textual content pre-defined by a user of the disconnected communication device.

24. The system of claim 22, wherein the notification handler is configured to convey the message to participants of the text exchange communication session using a communication mechanism other than a text-exchange communication mechanism.

25. The system of claim 22, wherein the notification handler is configured to convey the message to participants of the text exchange communication session using a text-exchange communication conveyed within the text-exchange session.

* * * * *